United States Patent [19]
Kosmo et al.

[11] Patent Number: 5,056,156
[45] Date of Patent: Oct. 15, 1991

[54] HELMET OF A LAMINATE CONSTRUCTION OF POLYCARBONATE AND POLYSULFONE POLYMERIC MATERIAL

[75] Inventors: Joseph J. Kosmo, Seabrook; Frederic S. Dawn, Houston, both of Tex.

[73] Assignees: United States of America as represented by the Administrator National Aeronautics and Space Administration, Washington, D.C.; The United States of America as represented by the Administrator of the National Aeronautics and Space Administration, Washington, D.C.

[21] Appl. No.: 443,414

[22] Filed: Nov. 30, 1989

[51] Int. Cl.$^5$ .......................... A42B 3/00; B32B 27/36
[52] U.S. Cl. .......................... 2/2.1 A; 2/411; 2/424; 428/412; 428/419; 428/458; 428/215
[58] Field of Search ............... 428/412, 458, 419, 215; 2/3, 2.1 A, 411, 424

[56] References Cited

U.S. PATENT DOCUMENTS

| | | | |
|---|---|---|---|
| 3,437,631 | 4/1969 | Cleveland | 260/37 |
| 3,933,734 | 1/1976 | Mark et al. | 260/45.7 S |
| 3,997,677 | 12/1976 | Hirsch et al. | 428/419 |
| 4,082,891 | 4/1978 | Curry et al. | 428/412 |
| 4,199,648 | 4/1980 | Curry et al. | 428/409 |
| 4,201,832 | 5/1980 | Hall et al. | 428/412 |
| 4,266,301 | 5/1981 | Canda | 2/410 |

FOREIGN PATENT DOCUMENTS 3155442 6/1988 Japan ................... 428/412

Primary Examiner—P. C. Sluby
Attorney, Agent, or Firm—Russell E. Schlorff; Harold W. Adamas; Edward Fein

[57] ABSTRACT

An article of laminate construction comprising an underlayer of polycarbonate polymer material 16 to which is applied a chemically resistant outer layer of polysulfone material 17. The layers 16, 17 which are joined by compression-heat molding, are moldable to form the shape of a body protective shell such as a space helmet 10 comprising a shell 18 of polycarbonate, polysulfone laminate construction attached at its open end to a sealing ring 19 adapted for connection to a space suit. The front portion of the shell 18 provides a transparent visor for the helmet. An outer visor 25 of polycarbonate polysulfone polymer laminate construction is pivotally mounted to the sealing ring 19 for covering the transparent visor portion of the shell 18 during extravehicular activities. The polycarbonate under layer of the outer visor 25 is coated on its inner surface with a vacuum deposit of gold to provide additional thermal radiation resistance.

8 Claims, 1 Drawing Sheet

U.S. Patent   Oct. 15, 1991   5,056,156
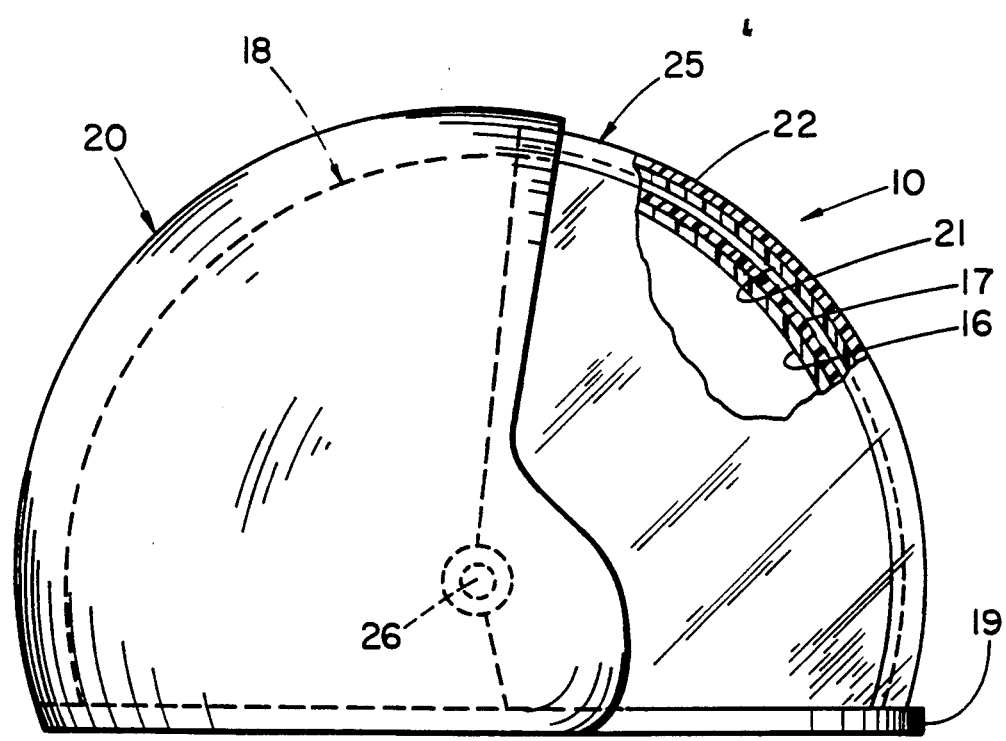

HELMET OF A LAMINATE CONSTRUCTION OF POLYCARBONATE AND POLYSULFONE POLYMERIC MATERIAL

ORIGIN OF THE INVENTION

The invention described herein was made by employees of the United States Government and may be manufactured and used by or for the Government of the United States of America for governmental purposes without the payment of any royalties thereon or therefor.

FIELD OF THE INVENTION

This invention relates to polycarbonate articles with chemical resistant coatings and more particularly to space suit helmets and visors which are provided with chemical resistant properties for chemical and spacecraft propellants hazards protection.

BACKGROUND ART

For astronauts engaged in extravehicular activity in the space environment, it is necessary to provide protection against a variety of environmental hazards. Included among such hazards is the corrosive effect of the various chemicals employed in spacecraft operations. An astronaut's contact with or close proximity to spacecraft chemical propellants as might occur during extravehicular refueling or propellant handling operations can result in structural degradation of the astronaut's space suit, helmet and visor assembly to a degree which greatly increases the danger from impacts with micrometeoroids, dust particles or space debris. In addition, the visor may become pitted and eroded to a degree which severely reduces the transparency of the visor and impairs the vision of the astronaut. With the prospect of long-term space missions associated with the deployment of space stations and lunar base or planetary surface operations, the hazards presented by such structural limitations of space suit helmets and visors will be greatly increased.

The helmets and visor assemblies which have been incorporated in space suits used in previous space programs have not incorporated any active or passive protective techniques for providing spacecraft propellant and chemical hazards protection. Although polycarbonate, which is currently used in space helmet construction, possesses some chemical resistant properties, it is structurally degradable on exposure to a variety of spacecraft propellants and other chemicals involved in extravehicular refueling and handling operations. In the prior art of protective garments with chemical resistant properties, U.S. Pat. No. 4,226,301 discloses a protective hood for protecting flight crew members from chemical-biological agents. The hood includes a helmet covering with a transparent lens of polycarbonate material. U.S. Pat. Nos. 4,199,648 and 4,082,891 disclose chemically resistant coatings for polycarbonate articles which coatings comprise the photoreaction product of a polythiol and a polyene.

U.S. Pat. No. 3,437,631 discloses a helmet fabricated from a mixture of polycarbonate resin and polyolefin, and U.S. Pat. Nos. 3,933,734 and 4,201,832 each disclose a polycarbonate composition which includes sulfuric acid or sulfonates and provides improved chemical resistance. While these prior art devices are suitable for many activities, they are unsuited for use in space helmets and visors.

SUMMARY OF THE INVENTION

The invention is an article of laminate construction comprising a polycarbonate underlayer to which is applied a chemically resistant outer layer of polysulfone polymer by means of compression molding and the application of heat. It is suitable for configuration in the form of a body protective shell such as a space suit helmet with associated visor assembly. The polysulfone layer provides protection against corrosive attack from the chemicals and spacecraft propellants to which it may be exposed during refueling or fuel handling operations.

BRIEF DESCRIPTION OF THE DRAWING

The drawing is an illustration of a space helmet fabricated from the unique polycarbonate polysulfone laminate of the invention.

DETAILED DESCRIPTION OF THE INVENTION

Referring more particularly to the drawing, there is illustrated an embodiment of the invention configured as a space suit helmet 10 which comprises an inner shell 18 of a truncated spherical configuration or bubble shape which is fitted at its open end with a metallic neck ring 19 suitable for sealing connection with a pressurized space suit. The rear portion of the helmet is provided with an outer shell 20 fabricated from epoxy and provided with a thermal control coating such as commercially available "CHEM-GLAZE", an epoxy composition which includes white pigment and a silicon binder or a multi-layer thermal/micrometeoroid protective layup. The front portion of the helmet shell 18 is left uncoated and serves as a transparent visor for an astronaut. For extravehicular activities, the helmet is equipped with an outer visor 25 which is provided with a special coating to be hereinafter described for purposes of thermal radiation protection. The outer visor is connected to the outer helmet shell 20 by pivot connections 26 located on opposite sides of the helmet.

Since polycarbonate polymer is characterized by a very high impact strength and is also transparent, it has been used as the structural material for space suit helmets where impact resistance to micrometeoroids, dust particles and space debris is a vital concern. Polycarbonate polymer is derived from bisphenol A and phosgene and has the following molecular structure and composition:

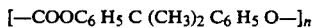

$$[-COOC_6H_5C(CH_3)_2C_6H_5O-]_n$$

In general, polycarbonate polymer, which might be formed from any dihydroxy compound and any carbonate diester, in addition to having high impact strength and dimensional stabilities, is transparent, non-corrosive, non-toxic, stain resistant and has good heat resistance and low water absorption properties. This wide range and combination of physical properties make polycarbonate polymer a very strong and versatile thermoplastic with significant performance and economic advantages over such materials as glass, metals and thermoset plastics. Although polycarbonate has been used in space suit helmets as the material of choice, it suffers from exposure to such spacecraft propellants as monomethylhydrazine ($N_2H_3CH_3$), hydrazine ($N_2H_4$), nitrogen tetroxide ($N_2O_4$), n-Heptane, toluene, and ammonia ($NH_3$) as well as other chemicals with which it may come in contact during extravehicular refueling and propellant handling operations. In time, the corrosive effects of such materials on polycarbonate will eventually cause its structural degradation to a degree which seriously weakens its impact resistance and will severely erode the visor surface to such degree that the vision of the astronaut is seriously impaired.

It has been found that chemical and propellant hazards protection for space suit helmets and visor assemblies can be obtained by applying an outer-layer of polysulfone to the inner-shell layer of polycarbonate. The two layers are compression molded together with the application of heat and pressure in a laminate construction to form the necessary shapes for a space suit helmet and a visor assembly.

Polysulfone polymer has the following repeating structure or basic unit.

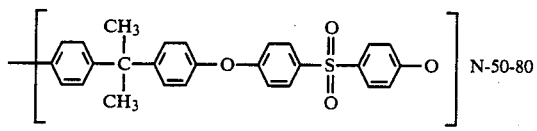

This structure unit is composed of phenylene units linked by three different chemical groups—isopropylidene, ether, and sulfone—each of which contributes specific properties to the polymer. The complex repeating structure imparts inherent properties to the polymer that conventionally are gained only by the use of mechanically added stabilizers or other chemical modifiers.

Polysulfone is a transparent, rigid, strong thermoforming plastic which can be molded, extruded, or thermoformed into a wide variety of shapes. It is both stable and self-extinguishing in its completely natural and unmodified form and maintains such useful properties over a temperature range from $-101°$ C. ($-150°$ F.) to $184°$ C. ($345°$ F.) and over extended periods of time. With many plastics, such qualities can sometimes be obtained by the addition of chemical modifiers which can undesirably affect the strength and other basic properties of the polysulfone.

In the backbone chain structure of polysulfone polymer, the most distinctive unit is the diphenylene sulfone group

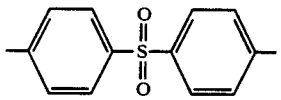

This sulfone group confers on the entire polymer molecule, the inherent characteristics of thermal stability, resistance to oxidation, and rigidity. The thermal stability and resistance to oxidation characteristics are of such magnitude that it will not support combustion. In addition, it is very resistant to hydrazine.

When a polycarbonate/polysulfone laminate is compression molded to form a space suit helmet 10 as shown in the drawing it provides a helmet with outstanding strength, impact and chemical resistance. In a space helmet construction, in accordance with the invention, a laminate shell 18 is provided comprising an underlayer 16 of polycarbonate of 1/16 inch (approximately 16 mm.) thickness and an outer layer 17 of polysulfone of identical 1/16 inch thickness. The laminate shell 18 is compression molded in a "bubble" shape configured as the portion of a sphere which is rigidly attached in fluid-tight sealing relation with a metallic sealing ring 19. The sealing ring 19 is adapted for attachment to an accommodating sealing ring located at the neck of a pressurizable space suit. Such a construction can withstand pressures or impact forces of fourteen foot pounds per square inch.

The helmet 10 may also be optionally provided with an outer protective shell 20 which covers the rear portion of the shell 18 and is disposed in concentric spaced relation thereto. The outer shell 20, which is typically an epoxy material coated with a thermal coating such as "CHEM-GLAZE", or a multi-layer thermal/micrometeoroid protective layup, is fastened at its lower edge along the outside of the ring 19.

For use by an astronaut engaged in extravehicular activities, the helmet 10 is provided with an outside visor 25 which is attached by pivot connections 26 to the opposite sides of the outer shell 20. The outside visor 25 is normally stowed in a retracted out-of-the-way position about the rear portion of the helmet between the shells 18 and 20 but can be pivotally moved forward to cover the front transparent portion of the helmet "bubble" 18 during an extravehicular excursion. The outer visor 25 is of the same laminate polycarbonate/polysulfone construction 21,22 as is the shell 18. For thermal radiation, the polycarbonate layer 21 of the outside visor 25 is coated on its inner surface with a vacuum deposit of gold to a thickness of 800 to 1200 angstrom units. If an outer shell 20 is not provided, the outer visor 25 is pivotally attached to suitable mounting adapters affixed to the ring 19.

Obviously, the unique laminate construction of the invention can be formed with different laminate thicknesses to provide different strengths and impact resistance capabilities for many different articles in a variety of shapes and sizes. Although the laminate is transparent, it could be tinted if desired, in lieu of gold coating, for such purposes as to reduce glare or provide protection from ultraviolet radiation.

It is therefore to be seen that a new and improved article of a polycarbonate/polysulfone laminar construction is disclosed herein which is characterized by great impact strength and resistance to corrosive chemicals, such as hydrazine, ammonia, nitrogen tetroxide, n-heptane, toluene, and monomethylhydrazine. It is particularly suitable for molding to the form of a body protective shell, such as a safety helmet or space suit helmet and because of its transparency is adapted for use as a visor or in other applications where transparency of an impact resistant structure is desired.

We claim:

1. An article of laminate construction adapted for configuration in the form of a protective shell, said article comprising:
   a rigid underlayer of polycarbonate polymer material approximately 0.0625 inch in thickness, and
   a rigid outer layer of polysulfone polymer material laminated to said layer of polycarbonate by thermal compression for providing resistance to chemical attack while preserving optical qualities of high visibility and transparency.

2. An article of laminate construction as set forth in claim 1 wherein said layers of polycarbonate polymer material and polysulfone polymer material are of approximately the same thickness.

3. An article of laminate construction as set forth in claim 1 wherein said layers of polycarbonate polymer material and polysulfone polymer material are compression molded in the shape of a helmet configured as a portion of a sphere and attached at its open end to a helmet sealing ring adapted for connection to a pressurizeable space suit whereby said article of laminate construction provides a high degree of impact resistance and said outer layer of polysulfone material provides resistance to chemical attack from spacecraft propellants including hydrazine, monomethylhydrazine, nitrogen tetroxide, n-Heptane, toluene and ammonia.

4. An article of laminate construction as set forth in claim 1 wherein said layers of polycarbonate polymer material and polysulfone polymer material are compression molded in the shape of a helmet configured as a portion of a sphere and attached at its open end to a helmet sealing ring adapted for connection to a pressurizeable space suit, said under layer of polycarbonate polymer material being provided on its inner surface with a vacuum deposit of gold to a thickness in the range of 800 to 1200 angstrom units.

5. An article of laminate construction as set forth in claim 1 wherein said layers of polycarbonate polymer material and polysulfone polymer material are compression molded in the shape of a body protective helmet shell configured as a portion of a sphere attached at its open end to a helmet sealing ring adapted for connection to a pressurizeable space suit, said helmet shell being uncoated in the front portion thereof whereby said uncoated portion provides a transparent visor for the helmet.

6. An article of laminate construction as set forth in claim 5 further including an outer visor in the form of a portion of a sphere, said outer visor being pivotally mounted to said helmet sealing ring at connections on opposite sides of said ring for pivotal movement between an out-of-the-way position which covers the exterior of the rear portion of said helmet shell and a forward position which covers the transparent visor portion of the helmet shell, said outer visor having a laminate construction with an underlayer of polycarbonate polymer material and an outer layer of polysulfone polymer material and said under layer of polycarbonate polymer material is coated on its inner surface with a vacuum deposit of gold to a thickness in the range of 800 to 1200 angstrom units.

7. A helmet for a pressurizeable space suit comprising:
   an article of laminate construction configured as a portion of a sphere and attached at its open end to a helmet sealing ring for connection to the pressurizeable space suit, said article comprising,
   a rigid underlayer of polycarbonate polymer material approximately 0.0625 inch in thickness,
   a rigid outer layer of polysulfone polymer material laminated to said layer of polycarbonate by thermal compression for providing resistance to chemical attack whereby said article of laminate construction provides a high degree of impact resistance and said outer layer of polysulfone material provides resistance to chemical attack from spacecraft propellants including hydrazine, monomethylhydrazine, nitrogen tetroxide, n-Heptane, toluene and ammonia while preserving optical qualities of high visibility and transparency.

8. The helmet specified in claim 7 including an outer visor in the form of a portion of a sphere, said outer visor being pivotally mounted to said helmet sealing ring at connections on opposite sides of said ring for pivotal movement between an out-of-the-way position which covers the exterior of the rear portion of said helmet shell and forward position which covers the transparent visor portion of the helmet shell, said outer visor having a thermal laminate construction with a rigid underlayer of polycarbonate polymer material and a rigid outer layer of polysulfone polymer material and said underlayer of polycarbonate polymer material is coated on its inner surface with a vacuum deposit of gold to a thickness in the range of 800 to 1200 angstrom units.

* * * * *